United States Patent [19]
Ju et al.

[11] Patent Number: 6,041,181
[45] Date of Patent: Mar. 21, 2000

[54] METHOD OF, SYSTEM FOR, AND COMPUTER PROGRAM PRODUCT FOR PROVIDING QUICK FUSION IN WHERE CONSTRUCTS

[75] Inventors: Dz Ching Ju, Sunnyvale; John Shek-Luen Ng, San Jose, both of Calif.; Vivek Sarkar, Newton, Mass.

[73] Assignee: International Business Machines Corporation, Armonk, N.Y.

[21] Appl. No.: 08/899,359

[22] Filed: Jul. 23, 1997

[51] Int. Cl.[7] ........................................................ G06F 9/45
[52] U.S. Cl. ........................... 395/709; 395/703; 395/705; 395/708
[58] Field of Search ..................... 395/709, 705, 395/706, 707, 708; 709/305

[56] References Cited

U.S. PATENT DOCUMENTS

| | | | |
|---|---|---|---|
| 5,093,916 | 3/1992 | Karp et al. | 709/305 |
| 5,146,594 | 9/1992 | Iitsuka | 395/708 |
| 5,313,614 | 5/1994 | Goettelmann et al. | 395/705 |
| 5,339,419 | 8/1994 | Chan et al. | 395/707 |
| 5,355,492 | 10/1994 | Frankel et al. | 395/707 |
| 5,355,494 | 10/1994 | Sistare et al. | 395/706 |
| 5,548,761 | 8/1996 | Balasundaram et al. | 395/707 |

OTHER PUBLICATIONS

International Fortran Standard Specification, ISO/IEC 1539:1991; ANSI X3.198–199x.

Allen, J.R. Dependence Analysis for Subscripted Variables and its Application to Program Transformation, PhD Thesis, Rice University, 1983.

Banerjee, U. Unimodular Transformations of Double Loops, Proceedings of the Third Workshop on Languages and Compilers for Parallel Computing, Aug. 1990.

Sarkar, V. Automatic Partitioning of a Program Dependence Graph into Parallel Tasks, IBM Journal of Research and Development, vol. 35, No. 5/6 Sep./Nov. 1991.

Wolfe, M.J. Optimizing Supercompilers for Supercomputers. MIT Press, Cambridge, Massachusetts, 1989. In the Series Research Monographs in Parallel and Distributed Computing.

*Primary Examiner*—Tariq R. Hafiz
*Assistant Examiner*—Antony Nguyen-Ba
*Attorney, Agent, or Firm*—Prenthiss W. Johnson

[57] ABSTRACT

FORTRAN WHERE construct compilation and optimization is provided by excluding an assignment statement containing a transformational intrinsic function from loop fusion of the WHERE construct. To perform this loop fusion, intrastatement dependence analysis is performed within each assignment statement of the WHERE construct, and then interstatement dependence analysis is performed between each assignment statement and assignment statements subsequent to the assignment statement. Responsive to this dependence analysis, pairs of assignment statements which may not be fused into a single loop are identified, and non-fusion boundaries between adjacent assignment statements where assignment statements preceding a non-fusion boundary and assignment statements subsequent to the non-fusion boundary may not be fused into a single loop are identified. This fusion analysis yields a loop fusion configuration. After the loop fusion configuration is identified and the rank of any temporary expression is determined, code generation is performed by scalarizing each assignment statement. This provides better optimization than the conventional straight forward approach to compiling a WHERE construct, and further provides an optimized compilation of a WHERE construct by the use of less compilation time than that required by conventional high-level optimization.

24 Claims, 7 Drawing Sheets

METHOD OF, SYSTEM FOR, AND COMPUTER PROGRAM PRODUCT FOR PROVIDING QUICK FUSION IN WHERE CONSTRUCTS

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to optimizing compilers for development of computer programs for use on a computer, and more particularly to Fortran 90 WHERE construct optimization, compilation, and interpretation.

2. Description of the Related Art

Recently, the X3J3 subcommittee of the American and National Standards Institute (ANSI), in collaboration with a corresponding International Standards Organization (ISO) group ISO/IEC JTC1/SC22/WG5, approved a new standard for the Fortran programming language. This new Fortran programming language standard is generally denominated the "Fortran 90" language standard and is also in the art denominated the "Fortran 90 Array Language" standard. While maintaining compatibility with and providing support for the previous "FORTRAN 77" language standard, this new Fortran 90 Array language standard defines many new programming constructs and functions.

Among these new features are the "array language" protocols. Fortran programs in the Fortran 90 language may specify operations to be performed on entire arrays or on specific sections of arrays. To facilitate these new array operations, the Fortran 90 standard defines a new class of array functions denominated "WHERE" constructs. The Fortran 90 standard is promulgated by the ISO as the International Fortran Standard specification number ISO/IEC 1539:1991 and is promulgated by the ANSI as specification number ANSI X3.198–199x.

The new features promulgated in the Fortran 90 language standard create new challenges for existing Fortran compiler and preprocessor technology. The existing FORTRAN 77 compilers do not address the array constructor functions and must be completely rewritten and restructured to accommodate the Fortran 90 standard. The new problems created by Fortran 90 array constructors can be appreciated with reference to the FORTRAN compiler art.

Figure 1:
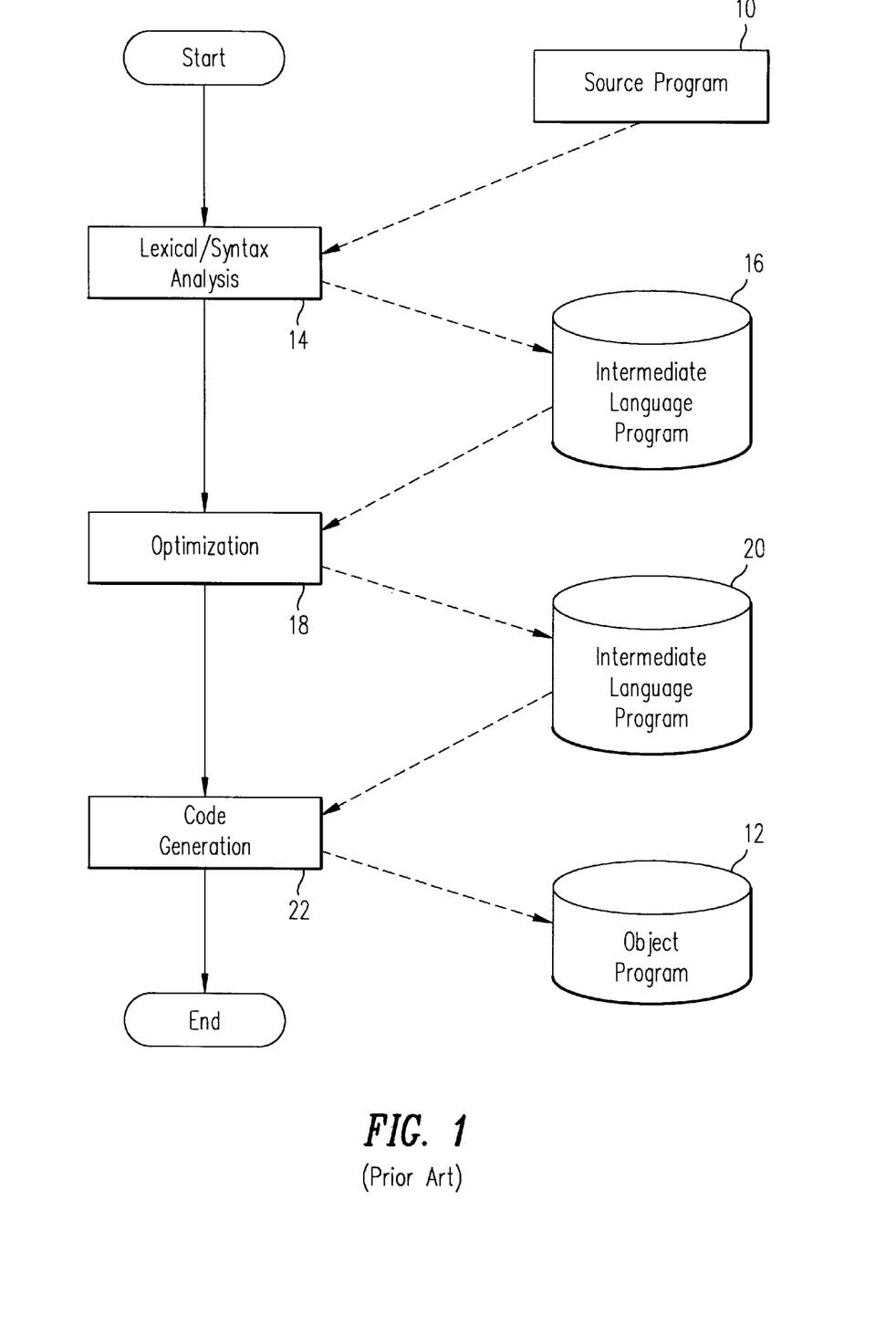
FIG. 1 shows a functional block diagram of an exemplary compiling method from the prior art.

FIG. 1 illustrates a procedure for translating a FORTRAN program 10 to create an executable binary object program 12. A lexical/syntax analysis 14 is conducted to transform source program 10 to a first intermediate language program 16. First intermediate language program 16 is then processed by an optimization routine 18 to create a second intermediate language program 20, which is then directly interpreted by the code generation routine 22 to create object program 12.

Figure 2:
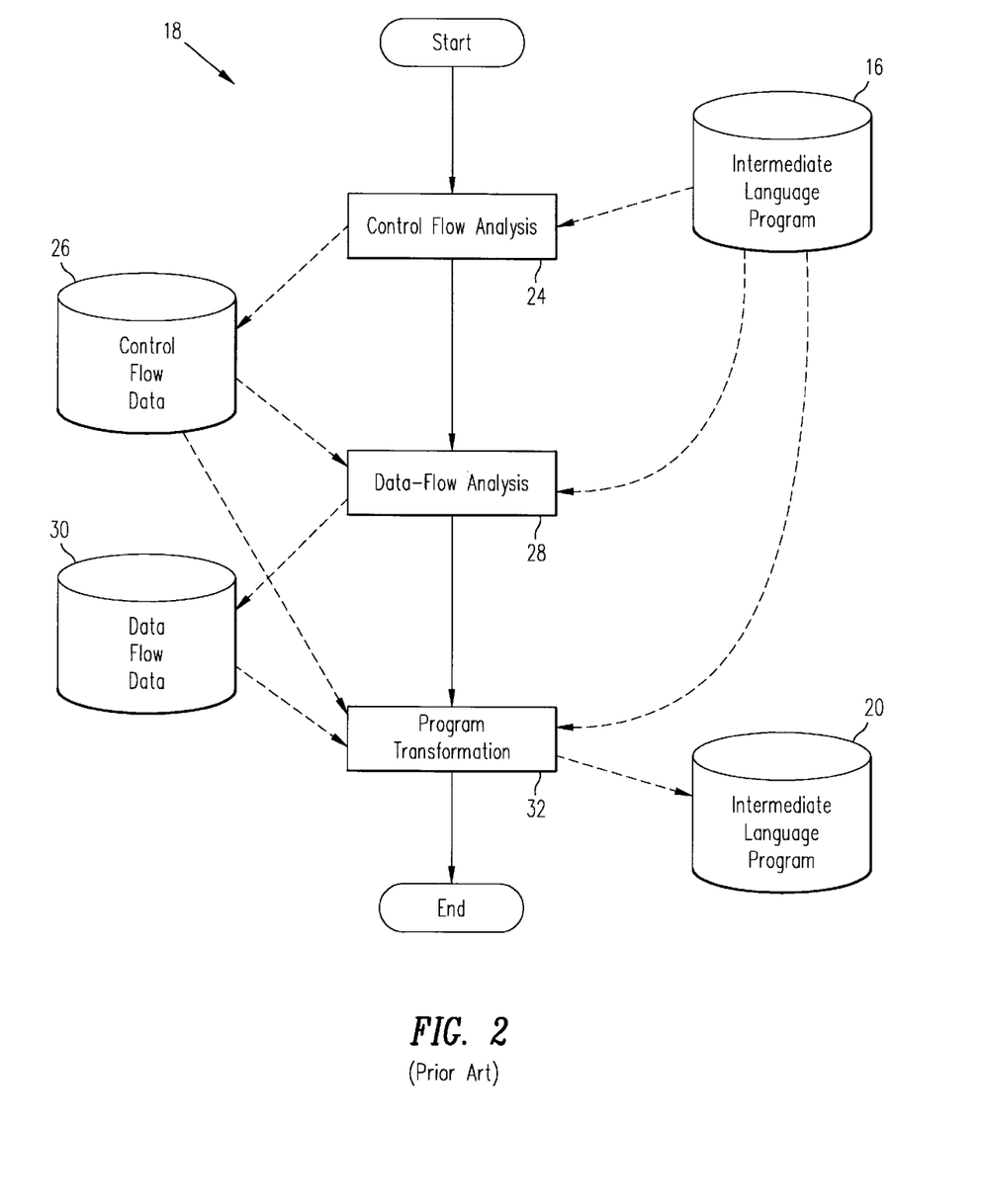
FIG. 2 shows a functional block diagram of an exemplary compiling optimization method from the prior art.

Lexical/syntax analysis routine 14 and code generation routine 22 are easily defined in terms of the Fortran 90 specification and the machine binary code set, respectively. Thus, it is optimization routine 18 that is primarily affected by the new Fortran 90 standard. Optimization routine 18 is illustrated in FIG. 2 as it is understood in the art. Optimization processing is achieved by first performing a control flow analysis in routine 24 of first intermediate language 16. Control flow analysis routine 24 provides the control flow data 26, which are then passed to a data-flow analysis routine 28 wherein first intermediate language program 16 is analyzed for data flow. Data-flow analysis routine 28 produces the data-flow data 30. Finally, a program transformation procedure 32 accepts control flow data 26, data-flow data 30, and first intermediate language program 16 to produce second intermediate language program 20.

Despite extensive effort in the compiler art related to optimization, the array transformation functions introduced by the new Fortran 90 standard bring with them new inefficiencies in storage and processing, and there is an accordingly clearly-felt need in the art for more efficient compiling procedures suitable for application to these new intrinsic Fortran 90 array transformation functions.

This problem can be better understood by considering an example. The Fortran 90 standard specification defines a WHERE statement as having the following form:

WHERE (mask-expr) var=expr in which the expression, "expr", of the assignment statement, "var=expr", is evaluated for all elements where the mask expression, "mask-expr", is true, and the result is assigned to the corresponding elements of "var".

The Fortran 90 standard specification also defines a WHERE construct as having the following syntax:

WHERE (mask-expr)
   [assignment statement]
[ELSEWHERE]
   [assignment statement]
END WHERE in which the masked array assignment statement is used to mask the evaluation of expressions and the assignment of values on an element-by-element basis, according to the value of a logical expression. The WHERE statement and WHERE construct are analogous to the IF statement and the IF construct in the Fortran 77 language.

The execution semantics of a WHERE construct is defined as follows. First, the mask expression is evaluated and stored. Each assignment statement in the WHERE construct is then evaluated, in sequence, as if it is the statement "WHERE (mask-expr) var=expr". Then each assignment statement in the ELSEWHERE block is evaluated, in sequence, as if it is the statement "WHERE (.not. mask-expr) var=expr". Note that the Fortran 90 language definition forbids nesting of WHERE constructs, and only array assignment statements are allowed within a WHERE construct.

The mask expression in a WHERE statement or construct controls the elements on which elemental operations such as "+" and "*" are performed, but does not control the elements on which transformational intrinsic functions (TIFs), such as SUM, are performed. This distinction is revealed in the following example from the Fortran 90 language standard document:

WHERE (A>0.0)
   A=LOG(A) LOG is invoked only for positive elements.
   A=A/SUM(LOG(A)) LOG is invoked for all elements.
END WHERE To invoke LOG only for positive elements in the TIF SUM function, a mask should be passed explicitly to the TIF SUM function by writing SUM(LOG(A), MASK=A>0.0).

The conventional way of optimizing WHERE Constructs is taught by John R. Allen ("Dependence Analysis for Subscripted Variables and its Application to Program Transformation, PhD thesis, Rice University, 1983). Allen teaches a conventional method of scalarizing WHERE Constructs as a simple extension to scalarizing array assignment statements.

As an example of Allen's teachings, consider the following WHERE statement:
WHERE (A(0:n−1).eq. 0) A(1:n)=A(2:n+1)+1. Using the legality test, those skilled in the art recognize that the assignment statement, A(1:n)=A(2:n+1)+1 with direction vector (>) may be legally scalarized as the code of the following Table A:

TABLE A

```
DO i = 1, n
    A(i) = A(i + 1) + 1
END DO
```

However, the following code of Table B is an invalid scalarization of the WHERE statement because of the loop-carried flow dependence from A(i) in the left hand side of the expression (LHS) to A(i−1) in the mask expression:

TABLE B

```
DO i = 1, n
    IF (A(i − 1) .eq. 0) THEN
        A(i) = A(i + 1) + 1
    END IF
END DO
```

To obtain a valid scalarization for a WHERE statement, the dependences between the expression LHS and the mask expression need to be considered in addition to the dependences between the expression LHS and the right hand side of the expression (RHS).

This is like an IF-conversion as taught by Allen where a control dependence is treated like a data dependence. The IF-conversion approach is well suited to WHERE statements and constructs because the control dependences are simple and well structured (there are no GOTO statements) into or out of a WHERE construct, and WHERE constructs cannot be nested.

To obtain a scalarization for the example, an array temporary, mtemp(i), for the mask expression, (A(0:n−1).eq. 0), may be introduced to eliminate the flow dependence as shown in the following Table C:

TABLE C

```
DO i = 1, n
    mtemp(i) = A(I−1) .eq. 0
END DO
DO i = 1, n
    IF (mtemp(i)) THEN
        A(i) = A(i + 1) + 1
    END IF
END DO
```

All the techniques discussed earlier for array assignment statements can be applied to WHERE statements, by taking both LHS—RHS and LHS—MASK dependences into account.

The extension for introducing array temporaries is more complicated as mask and data temporaries have slightly different properties. For instance, if the i loop in the example is reversed, then the LHS—MASK direction vector will be (>), and the LHS—RHS direction will be (<). It appears that only a data temporary need be introduced, and not a mask temporary. However, introducing the data temporary splits the LHS=RHS statement into two statements, each of which must be guarded by the same mask expression. Therefore, forcing the introduction of a mask temporary as well. In general, the number of dimensions in the mask temporary must be greater than or equal to the number of dimensions in the data temporary.

WHERE constructs are more complicated than WHERE statements. In general, the mask expression needs to be stored in a full-sized temporary because the mask value may be needed in more than one loop nest. After the individual WHERE statements have been scalarized and optimized, fusing of their loops may be attempted. After any such loop fusion, IF-fusion on the mask expression may also be attempted if the two loop nests originated from the same WHERE block or ELSEWHERE block as the mask expression will be the same in both loop nests. Loop fusion and IF-fusion may then lead to a reduction in the size of the mask temporary.

A straight forward conventional approach to compiling a WHERE construct is to treat it as a sequence of WHERE statements. This conventional approach teaches the following steps:

Evaluate the mask expression, mask-expr, and keep the result;

Evaluate each assignment statement, "var=expr", inside the WHERE block as if it is the WHERE statement "WHERE (mask-expr) var=expr"; and Evaluate each assignment statement, "var=expr", inside the ELSEWHERE block as if it is the statement "WHERE (.not. mask-expr) var=expr".

An improved conventional approach for high-level optimization is to fuse this sequence of WHERE statements into the same loop, if possible. This improved approach to compile a WHERE construct is:

Treat the WHERE construct as a sequence of WHERE statements;

Then scalarize each WHERE statement as before;

Compute intrastatement data dependence for each WHERE statement and find the correct scalarization for each WHERE statement; and Compute interstatement data dependence between every pairs of statements and iteratively try to fuse these statements into the same loop.

The conventional approaches above to compiling WHERE constructs either provide no optimization, such as the straight forward approach, or provide high-level optimization after considerable compilation time.

Thus, existing methods provide no medium-level of optimization with a fast compilation time. As such, there is a need for a method of, system for, and computer program product for, providing a medium-level of optimization for WHERE constructs with a fast compilation time.

SUMMARY OF THE INVENTION

The invention disclosed herein comprises a method of, a system for, and an article of manufacture for providing FORTRAN WHERE construct compilation and optimization.

In accordance with one aspect of this invention, an assignment statement containing a transformational intrinsic function is excluded from loop fusion of a WHERE construct.

In accordance with another aspect of this invention, intrastatement dependence analysis is performed within each assignment statement of a WHERE construct.

In accordance with another aspect of this invention, interstatement dependence analysis is performed between each assignment statement and each assignment statement subsequent to said each assignment statement of a WHERE construct.

In accordance with another aspect of this invention, interstatement dependence analysis is demand driven.

In accordance with another aspect of this invention, pairs of assignment statements of a WHERE construct which may not be fused into a single loop are identified.

In accordance with another aspect of this invention, non-fusion boundaries between adjacent assignment statements where assignment statements preceding a non-fusion boundary and assignment statements subsequent to the non-fusion boundary may not be fused into a single loop are identified.

In accordance with another aspect of this invention, a rank of a mask temporary is removed or reduced.

In accordance with another aspect of this invention, assignment statements of a WHERE construct are fused into a common loop.

The present invention has the advantage of providing better optimization than the conventional straight forward approach to compiling a WHERE construct.

The present invention has the further advantage of providing an optimized compilation of a WHERE construct by the use of less compilation time than that required by conventional high-level optimization.

BRIEF DESCRIPTION OF THE DRAWINGS

For a more complete understanding of the present invention and the advantages thereof, reference is now made to the Detailed Description in conjunction with the attached Drawings, in which.

DESCRIPTION OF THE PREFERRED EMBODIMENT

WHERE construct optimization and compilation by the present invention may be performed by the following steps:

Perform transformational intrinsic function (TIF) pull-outs to exclude an assignment statement containing a TIF from the fusing.

Perform intrastatement dependence within each assignment statement.

Perform interstatement dependence between each assignment statement and each assignment statement subsequent to said each assignment statement, or alternatively, perform interstatement dependence on demand.

Identify pairs of assignment statements which may not be fused into a single loop.

Identify non-fusion boundaries between adjacent assignment statements where assignment statements preceding a non-fusion boundary and assignment statements subsequent to the non-fusion boundary may not be fused into a single loop.

Remove or reduce rank of mask temporary.

Fuse assignment statements and generate scalarized code.

Since the mask expression in a WHERE statement or construct does not control the elements on which transformational intrinsic functions (TIFs), such as SUM, are performed, TIF pull-outs are performed to exclude any assignment statements containing a TIF from the fusing. The WHERE construct logical expression and all assignments inside the WHERE construct are walked and TIFs are pulled-out. Do-loops are formed for reduction functions such as SUM. Since expressions inside reductions are in general not conformable with the result, loops formed from reductions are not candidates for fusion.

Intrastatement data dependence analysis is performed either during or after the above walk through. Responsive to the intrastatement data dependence analysis, loop reversal may be performed to minimize or remove an array temporary. Subscript tables are built. Pull-outs for a temporary are of the form $\&T(1:N)=A(1:N)+A(N:1:-1)$; i.e. the assignments are not yet scalarized.

After intrastatement data dependence analysis is performed, interstatement data dependence analysis is performed in which any interstatement data dependences between pairs of statements is computed. As a temporary is also created for the logical expression, there is no need to compute data dependence between the logical expression and the assignments. Interstatement dependence analysis, when applied to assignments inside WHERE constructs, is similar to single statement or intrastatement dependence analysis. For example, if statement s1 and statement s2 are statements inside the two different loop nests to be fused:

s1: l1=r1 s2: l2=r2 then the interstatement data dependence analysis computes direction vectors for subscripts from statement s1 to statement s2 (source, sink) namely:

a. between l1 and l2 (output)

b. between l1 and r2 (true)

c. between r1 and l2 (anti).

After interstatement data dependence analysis, then fusion analysis is performed in which interstatement data dependences are used to identify which statements may not be fused into the same loop, and consequently which statements may be fused into the same loop. For example, the following pairs of statement s1 and statement s2 may not be fused into the same loop:

| s1: B(i)      | = | s1: B(i) = |            | s1:          | = B(i) |
|---------------|---|------------|------------|--------------|--------|
| s2: B(i + 1) = |   | s2:        | = B(i + 1) | s2: B(i + 1) = |        |

If there is a (>) between statements s1 and s2 within a level being fused, then there must be a (<) entry at an outer level for the two statements s1 and s2 to be fused. Table D is a listing of pseudo-code for performing the identification of statements that may be fused and statements that may not be fused. Table E is a listing of pseudo-code for performing an identification of a loop fusion configuration based on the fusion and non-fusion statement identification.

After a loop fusion configuration is identified by the fusion analysis, then the process determines if a mask temporary is needed and the rank of the mask temporary. This stage first computes direction vectors between the logical expression and the assignments. If any operands of the logical expression are updated in any except the last loop nest, then create a mask temporary else look for the left most (>) entry of the direction vectors of all array operands of the logical expression. This will indicate the rank of the mask temporary needed. If it occurs at level li, the rank of the mask temporary is (total levels+1−li). If it does not exist, then a mask temporary is not needed for the logical expression. Sometimes the logical expression is a complicated expression and saving it in a mask temporary may be more profitable if the logical expression is used in different loop nests, even though no direct dependence exists between the logical expression and the rest of the assignments.

After the loop fusion configuration is identified and the rank of the temporary expression are determined, the last stage is code generation in which each assignment is scalarized by conventional compilation. Do loops and flow statements are also constructed.

TABLE D

```
/* For each block of statements not intervened by TIF pull-outs,
    identify which
/* statements may be fused at each level:
    For each level &li starting with the outermost;
        For each statement si;
            For each statement sj following si (j>i);
                if si & sj cannot be fused then
                    {put a fusion preventing edge connecting from sj
                    to si if one does not exist, and exit sj loop};
                    (Do not compute dependences between si and sj'
                    for j'>j if si and sj cannot be fused.)
                    (Notice that > is okay when dominated by < and
                    one edge per level is built.)
                end;
        end;
    end;
```

TABLE E

```
/* Identify the configuration of fused loops:
    last_stmt(1:sn,0) = sn;
    For each level &li starting the outermost;
        si=1;
        Do while si <= sn;
            prev_start = si;
            From si to last_stmt(si,&li−1) do;
                if there is a fusion-preventing edge
                    originated from si | si =
                last_stmt(si,&li−1) then
                    {matrix(si−1,&li) = end;
                    matrix(si,&li) = start;
                    last_stmt(prev_start,&li) = si−1;
                    prev_start = start};
                si = si + 1;
            end;
        end;
    end;
/* The output is a matrix similar to that shown in Table F
    indicating which statements
/* may be fused at each level. "s" and "e"
    indicate the start and end of a loop nest.
```

TABLE F

| | Level and/or Induction Variable | | |
|---|---|---|---|
| Statement | &1 | &2 | &3 |
| s1 | s | s | s |
| s2 | | | e |
| s3 | | | s |

TABLE F-continued

| | Level and/or Induction Variable | | |
|---|---|---|---|
| Statement | &1 | &2 | &3 |
| s4 | | e | e |
| s5 | | s | s |
| s6 | e | e | e |

/* This matrix corresponds to the statements and loop nests of Table G.

TABLE G

```
do &1
    do &2
        do &3
            s1; s2
        enddo
        do &3
            s3; s4
        enddo
    enddo
    do &2
        do &3
            s5; s6
        enddo
    enddo
enddo
```

Consider the following example in which the present invention is applied to the optimization and compilation of a WHERE construct. Table H is a WHERE construct comprising statements s1 (mask expression), s2 (first WHERE assignment where mask expression is true), s3 (second WHERE assignment where mask expression is true), and s4 (ELSEWHERE assignment where mask expression is false).

TABLE H

| s1: | WHERE (a(2:k + 1) = 1) |
| s2: | a(1:k) = b(1:k) |
| s3: | b(1:k) = a(0:k−1) |
| | ELSEWHERE |
| s4: | a(2:k + 1) = b(2:k + 1) + a(1:k) |
| | END WHERE |

First, TIF pull-outs are performed to exclude any assignment statements containing a TIF from the fusing. Although this simple illustrative example does not contain a TIF, if it did contain one such as "A=A/SUM(LOG(A))", then a do-loop separate from the fused loops would be formed for the SUM.

Next, intrastatement dependence is performed as shown in Table I. This indicates that there is a (>) intrastatement dependence within statement s4. Response to this intrastatement dependence identification, loop reversal is performed on statement s4 yielding statement s4'.

TABLE I

| s2: | a(1:k) = b(1:k) | |
| s3: | b(1:k) = a(0:k−1) | |
| s4: | a(2:k + 1) = b(2:k + 1) + a(1:k) | |
| ==> | | |
| s2: | a(1:k) = b(1:k) | |
| s3: | b(1:k) = a(0:k−1) | |
| s4: | a(2:k + 1) = b(2:k + 1) + a(1:k) | (>)intrastatement data dependence |
| ==> | | |
| s4': | a(k + 1:2:−1) = b(k + 1:2:−1) + a(k:1:−1) | (<) after loop reversal |

Next, interstatement dependence analysis is performed between each assignment statement and each assignment statement subsequent to said each assignment statement as shown in Table J. If the example of Table I is modified to include an additional statement s5, such as b(1:k)=a(1:k), then no interstatement dependence analysis is performed between s1 and s5, s2 and s5, or s3 and s5 as the non-fusion boundary created between s3 and s4' eliminates any need to perform interstatement dependence analysis between these statements. Interstatement dependence analysis is only performed between s4' and s5; thus, the interstatement dependence analysis is demand driven resulting in a reduced compilation time.

TABLE J

| | |
|---|---|
| s2: | a(1:k) = b(1:k) |
| s3: | b(1:k) = a(0:k−1) |
| s4': | a(k + 1:2:−1) = b(k + 1:2:−1) + a(k:1:−1) |
| | s2 => s3  for a, true, (<) |
| | s2 => s3  for b, anti, (=) |
| | s2 => s4'  for a, true, (*) |
| | s2 => s4'  for a, outp, (*) |
| | s3 => s4'  for b, true, (*) |
| | s3 => s4'  for a, anti, (*) |

Next, pairs of assignment statements which may not be fused into a single loop are identified as shown in Table K which indicates that statements s2 and s4' may not be fused and that statements s3 and s4' may not be fused. Based on this, a non-fusion boundary is identified between statements s3 and s4' indicating that statements s2 and s3 may be fused into a loop.

TABLE K

| | Statement | Induction Variable &1 |
|---|---|---|
| s2−>s4' | | |
| s3−>s4' | s2 | s |
| | s3 | e |
| | s4' | s/e |

Now that a loop fusion configuration is identified, the process determines if a mask temporary is needed and the rank of the mask temporary. As an operand, "a", of the WHERE logical expression, "WHERE (a(2:k+1)==1)", is updated in any except the last loop nest, then a mask temporary is needed of rank 1 (total levels+1−li=1+1−1).

Based upon the above loop configuration and mask temporaries, scalarized code may be generated as shown in Table L.

TABLE L

| | |
|---|---|
| | do &1 = 1,k |
| s1: | &masktemp (&1) = (a(&1 + 1) == 1) |
| | if (&masktemp(&1)) then |
| s2: | a(&1) = b(&1) |
| s3: | b(&1) = a(&1 − 1) |
| | endif |
| | enddo |
| | do &1 = 1,k |
| s4: | if (.not.&masktemp(k + 1 − &1))a(k + 2 − &1) = b(k + 2 − &1) + a(k + 1 − &1) |
| | enddo |

Figure 3:
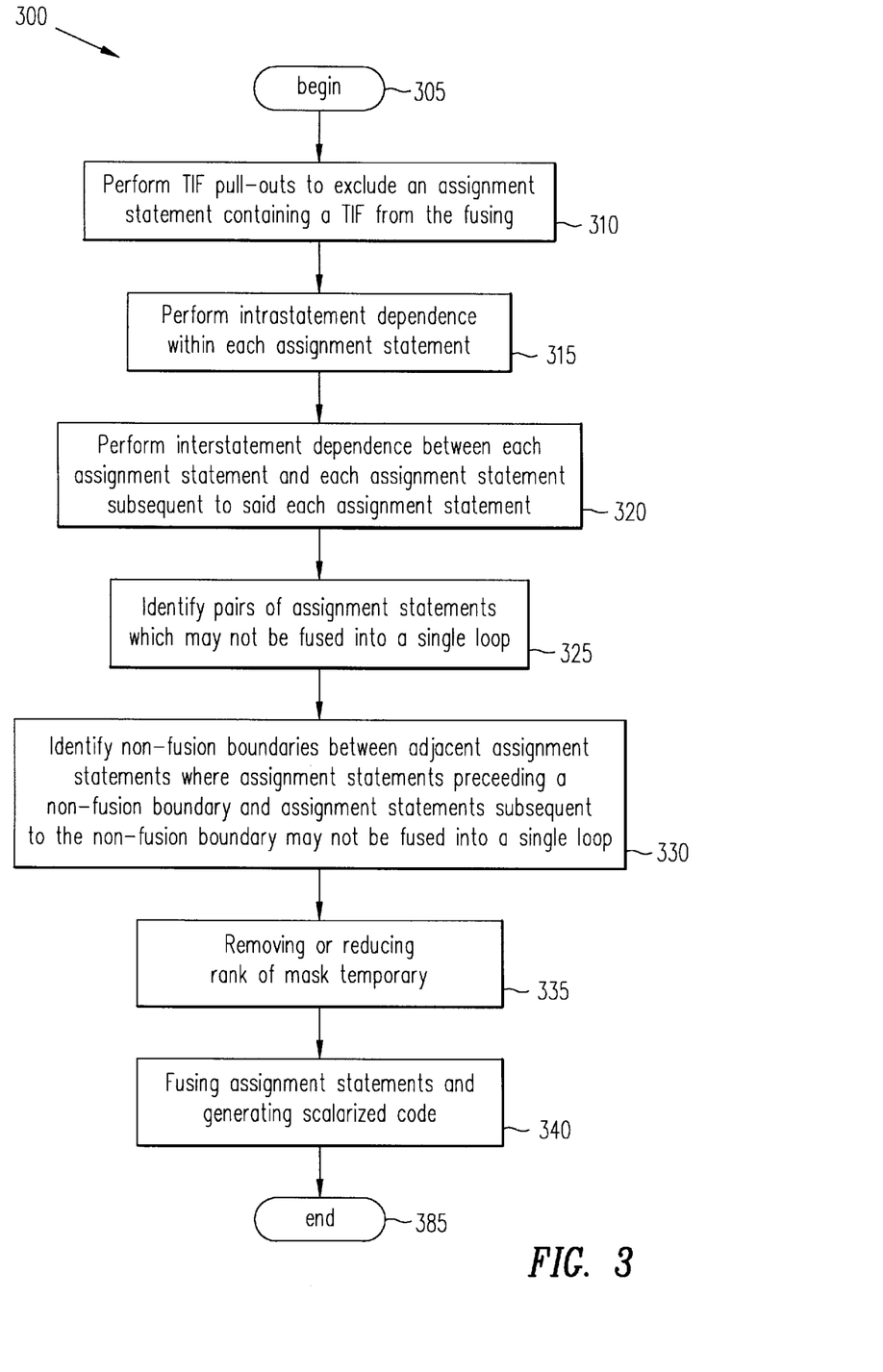
FIG. 3, FIG. 4, FIG. 5, and FIG. 6 are flowcharts illustrating the operations preferred in carrying out the present invention.
Figure 4:
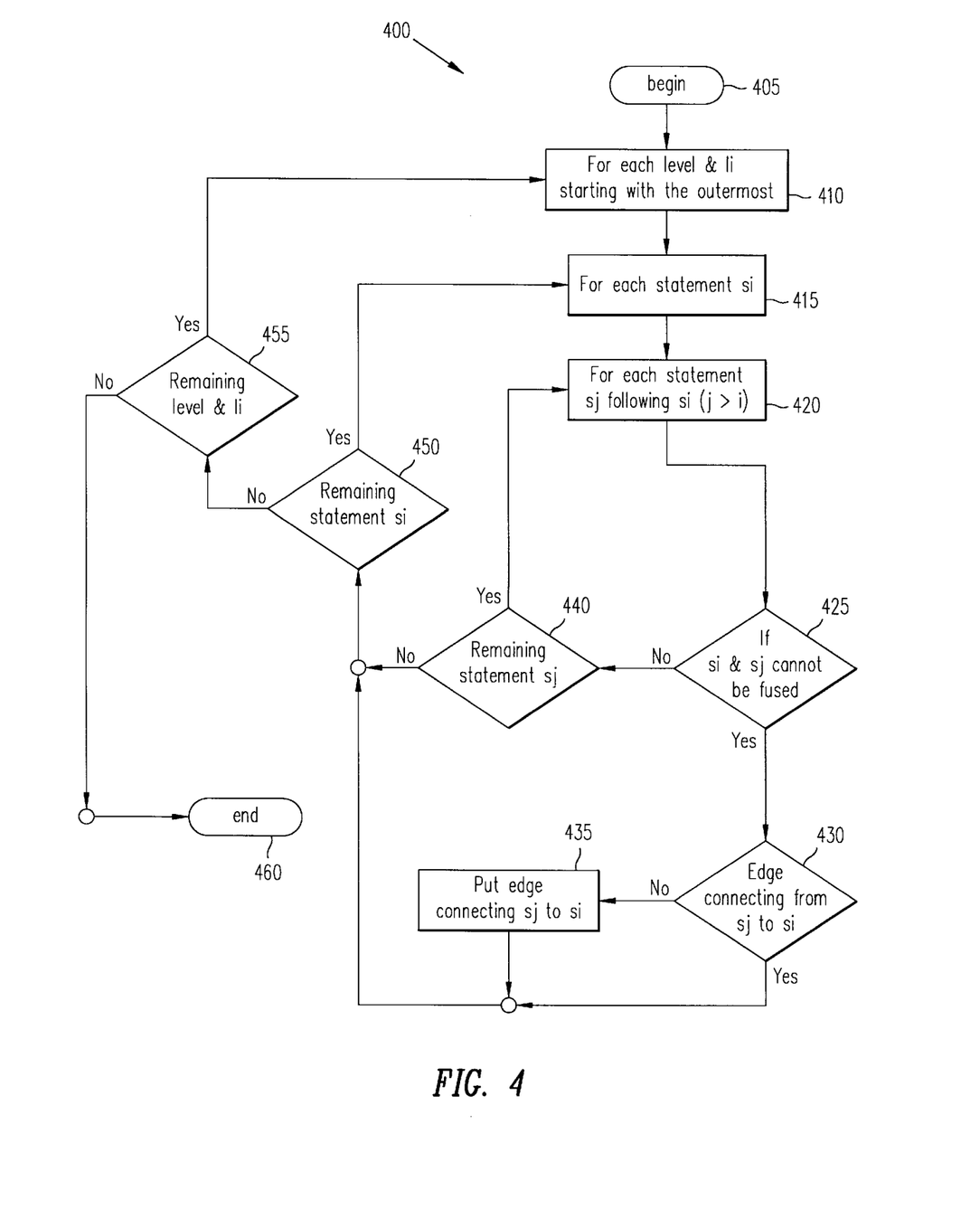
Figure 5:
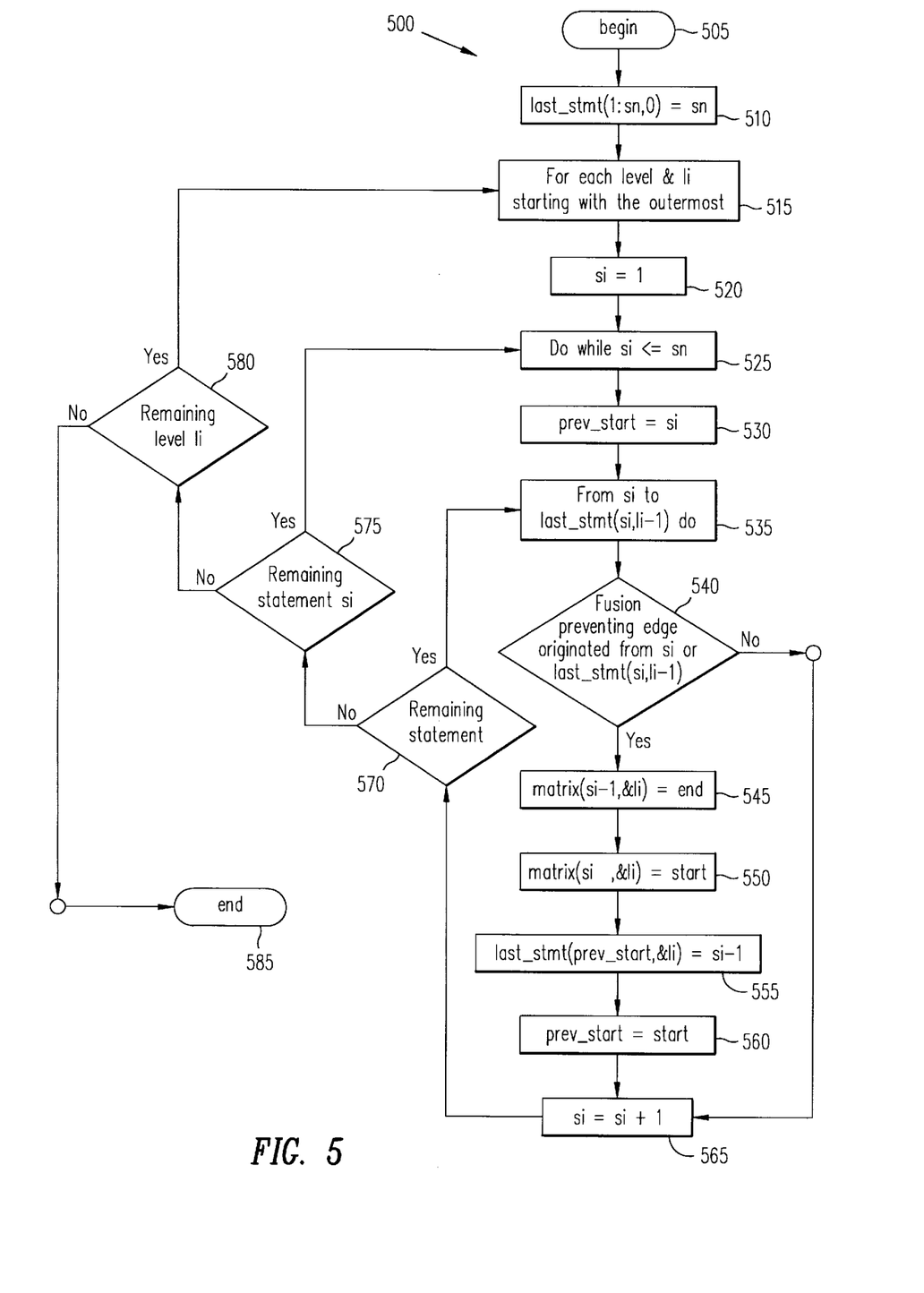

Referring next to FIG. 3 through FIG. 5, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill in the art to write code in any suitable computer programming language.

Referring now to FIG. 3, the process of the invention, generally referred to as 300, begins at process block 305. Thereafter, process block 310 performs TIF pull-outs to exclude an assignment statement containing a TIF from the fusing. After any TIF containing assignments are pulled from the fusion process, process block 315 performs intrastatement dependence within each assignment statement, and then process block 320 performs interstatement dependence between each assignment statement and each assignment statement subsequent to said each assignment statement. After intrastatement and interstatement dependencies are identified, process block 325 identifies pairs of assignment statements which may not be fused into a single loop. Thereafter, process block 330 identifies non-fusion boundaries between adjacent assignment statements where assignment statements preceding a non-fusion boundary and assignment statements subsequent to the non-fusion boundary may not be fused into a single loop. Thereafter, process block 335 removes or reduces the rank of any mask temporary. Finally, process block 340 fuses assignment statements and generates scalarized code, and then the process ends at process block 345.

Referring next to FIG. 4, the dependence analysis process, generally referred to as 400, is an expansion of process block 320 and process block 325. This process 400 begins at process block 405. Thereafter, the process enters the first of three nested loops. This loop starts at process block 410 and loops for each level &li starting with the outermost level through decision block 455. These levels correspond to potential DO loop nesting levels where the outermost level is level 1. The second nested loop starts at process block 415 and loops for each statement si within a level through decision block 450. The third nested loop starts at process block 420 and loops for each statement sj following si (j>i) through decision block 440. In each iteration of this third loop, decision block 425 determines if si & sj cannot be fused. If there is a (>) between statements sj and si within a level being fused, then there must be a (<) entry at an outer level for the two statements sj and si to be fused. If si & sj cannot be fused, then decision block 430 determines if there is already a fusion-preventing edge connecting from sj to si. If there is not a fusion-preventing edge connecting from sj to si, then process block 435 puts a fusion-preventing edge connecting from sj to si, and processing exits the third loop to decision block 450, which determines if there is any remaining statement si to be processed by the second loop. If there is any remaining statement si to be processed, then the process loops back to process block 415, the start of the second loop to process the remaining statement si. This early exit of the innermost third sj loop prevents the computation of dependences between si and sj' for j'>j if si and sj cannot be fused, thus providing a demand-driven data dependence analysis for loop fusion.

Returning now to decision block 430, if there is an edge connecting from sj to si, then processing exits the third loop to decision block 450, which determines if there is any remaining statement si to be processed by the second loop.

Returning now to decision block 425, if si & sj can be fused, then processing continues to the end of the third loop, decision block 440, which determines if there is any remaining statement sj to be processed. If there is any remaining statement sj to be processed, then processing loops back to the beginning of the third loop, process block 420, to process the remaining statement sj.

Returning now to decision block 440, if there is not any remaining statement sj to be processed, then processing continues to the end of the second loop, decision block 450, which determines if there is any remaining statement si to be processed by the second loop. If there is any remaining statement si to be processed, then the process loops back to process block 415, the start of the second loop to process the remaining statement si.

Returning now to decision block 450, if there is not any remaining statement si to be processed by the second loop, then processing continues to the end of the first loop, decision block 455 which determines if there is any remaining level &li to be processed by the first loop. If there is any remaining level &li to be processed by the first loop, then the process loops back to process block 410, the start of the first loop to process the remaining level.

Returning now to decision block 455, if there is not any remaining level &li to be processed by the first loop, then the process ends at process block 460.

Referring next to FIG. 5, the fusion analysis process, generally referred to as 500, is an expansion of process block 330. This process 500 also comprises three nested loops. The first loop starts at process block 515 and loops for each level &li starting with the outermost level through decision block 580. The second nested loop starts at process block 525 and loops while si is less than or equal to sn through decision block 575. The third nested loop starts at process block 535 and loops from si to last_stmt(si,&li−1) through decision block 570.

The process begins at process block 505, and thereafter, process block 510 sets last_stmt(1:sn,0) equal to sn to initialize the first loop starting at process block 515. Within the first loop, process block 520 sets si equal to 1 to initialize the second loop starting at process block 525. Within the second loop, process block 530 sets prev_start equal to si to initialize the third loop starting at process block 535. In each iteration of this third loop, decision block 540 determines if there is a fusion preventing edge originating from si or last_stmt(si,&li−1). If there is a fusion preventing edge originated from si or last_stmt(si,&li−1), then process block 545 sets matrix(si−1,&li) equal to end; process block 550 sets matrix(si,&li) equal to start; process block 555 sets last_stmt(prev_start,&li) equal to si−1; and process block 560 sets prev_start equal to start. Thereafter, process block 565 increments by one the loop index si, and thereafter, decision block 570 determines if there is any remaining statement to be processed by the third loop. If there is any remaining statement to be processed by the third loop, then the process loops back to process block 535, the start of the third loop, to process the remaining statement.

Returning now to decision block 540, if there is not a fusion preventing edge originating from si or last_stmt(si, &li−1), then processing continues to process block 565 to increment the loop index si.

Returning now to decision block 570, if there is not any remaining statement to be processed by the third loop, then processing continues to the end of the second loop, decision block 575 which determines if there is any remaining statement si to be processed by the second loop. If there is any remaining statement si to be processed by the second loop, then the process loops back to process block 525, the start of the second loop, to process the remaining statement si.

Returning now to decision block 575, if there is not any remaining statement si to be processed by the second loop, then processing continues to the end of the first loop, decision block 580 which determines if there is any remaining level li to be processed by the first loop. If there is any remaining level li to be processed by the first loop, then the process loops back to process block 515, the start of the first loop, to process the remaining level li.

Returning now to decision 580, if there is not any remaining level li to be processed by the first loop, then the process ends at process block 585.

Figure 6:
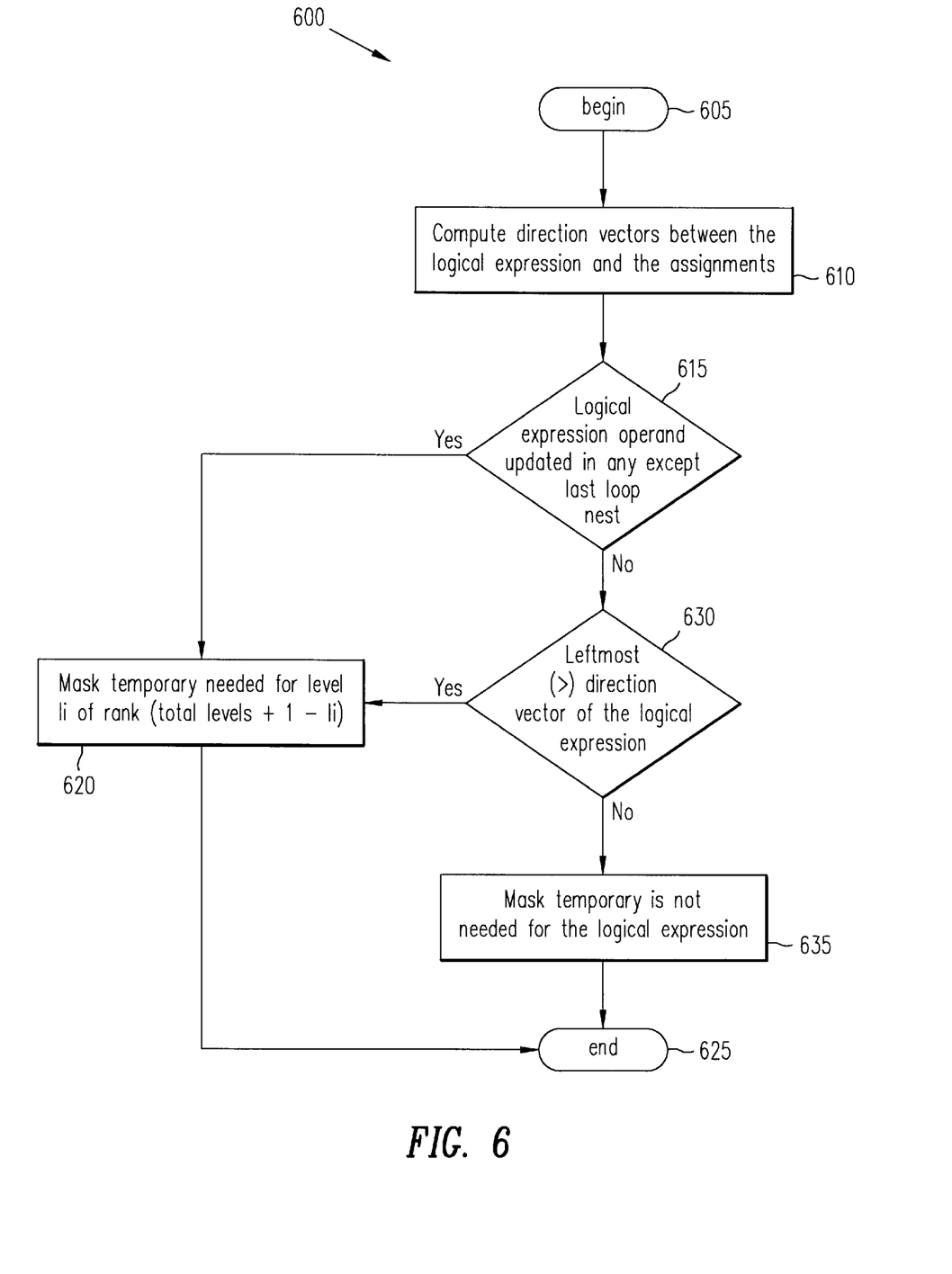

Referring next to FIG. 6, the mask temporary process, generally referred to as 600, is an expansion of process block 335. This process 600 begins at process block 605, and thereafter, process block 610 computes direction vectors between the logical expression and the assignments. Thereafter, decision block 615 determines if any logical expression operand is updated in any except the last loop nest. If a logical expression operand is updated in any except the last loop nest, then a mask temporary is needed for level li of rank (total levels+1−li) and process block 620 creates such a mask temporary. Thereafter, the process ends at process block 625.

Returning now to decision block 615, if no logical expression operand is updated in any except the last loop nest, then decision block 630 determines if there is a left most (>) entry of a direction vector of an array operand of the logical expression. If there is, then a mask temporary is needed for level li of rank (total levels+1−li) and processing continues to process block 620 to create such a mask temporary.

Returning now to decision block 630, if there is not a left most (>) entry of a direction vector of an array operand of the logical expression, then process block 635 indicates that a mask temporary is not needed, and then the process ends at process block 625.

Figure 7:
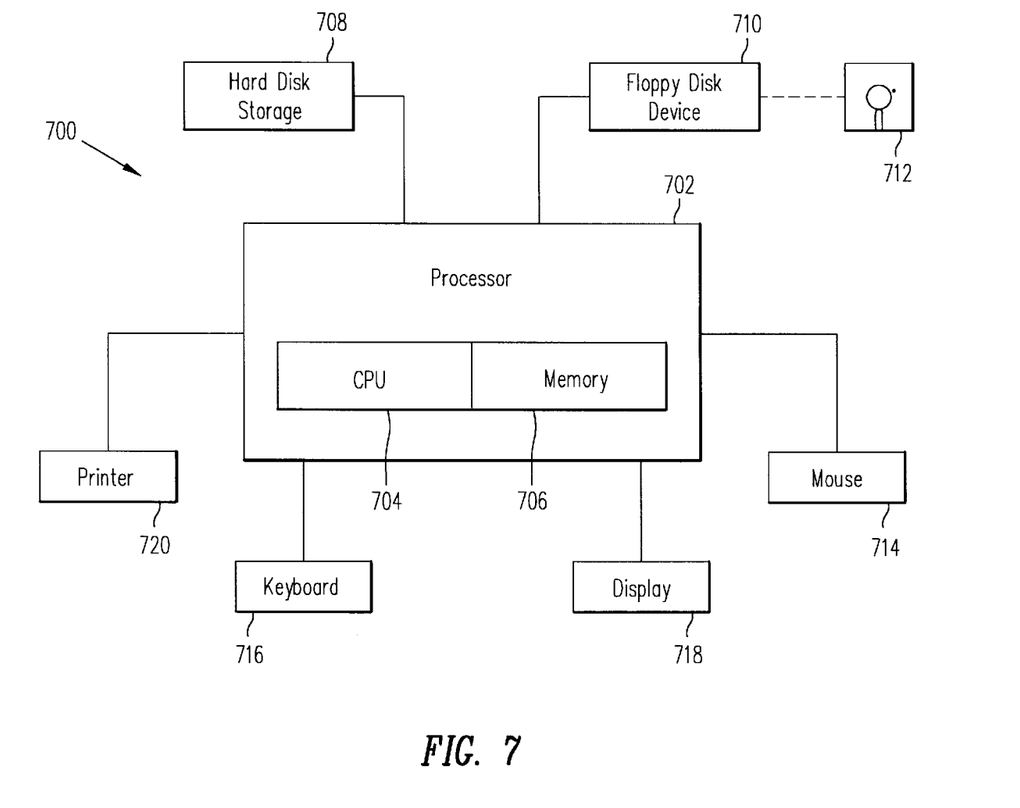
FIG. 7 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 7, a block diagram illustrates a computer system 700 used in performing the method of the present invention, forming part of the apparatus of the present invention, and which may use the article of manufacture comprising a computer-readable storage medium having a computer program embodied in said medium which may cause the computer system to practice the present invention. The computer system 700 includes a processor 702, which includes a central processing unit (CPU) 704, and a memory 706. Additional memory, in the form of a hard disk file storage 708 and a computer-readable storage device 710, is connected to the processor 702. Computer-readable storage device 710 receives a computer-readable storage medium 712 having a computer program embodied in said medium which may cause the computer system to implement the present invention in the computer system 700. The computer system 700 includes user interface hardware, including a mouse 714 and a keyboard 716 for allowing user input to the processor 702 and a display 718 for presenting visual data to the user. The computer system may also include a printer 720.

Although the present invention has been particularly shown and described with reference to a preferred embodiment, it will be understood by those skilled in the art that various changes in form and detail may be made without departing from the spirit and the scope of the invention.

We claim:

1. A method of translating a WHERE construct, containing a plurality of assignment statements, in a source program, said method comprising the steps of:

identifying a first subset of the plurality of assignment statements, the first subset comprising a pair of assignment statements which may not be fused into a single loop, by storing an indication of the pair of assignment statements in a three dimensional data structure, wherein:

a first dimension corresponds to a first assignment statement of the pair of assignment statements;

a second dimension corresponds to a second assignment statement of the pair of assignment statements;

a third dimension corresponds to a loop level at which the pair of assignment statements may not be fused into a single loop; and the indication is indexed by the first assignment statement, the second assignment statement, and the loop level;

responsive to the identifying of the first subset, identifying a second subset of the plurality of assignment statements which may be fused into a single loop; and responsive to the identifying of the second subset, fusing the second subset of the plurality of assignment statements into a single loop.

2. The method of claim 1 wherein the step of identifying the first subset of the plurality of assignment statements which may not be fused into a single loop further comprises identifying a transformational intrinsic function.

3. The method of claim 2 wherein the step of fusing assignment statements further comprises the step of:

excluding an assignment statement containing an intrinsic transformational function from the fusing.

4. The method of claim 1 wherein the step of identifying the first subset of the plurality of assignment statements which may not be fused into a single loop further comprises performing intrastatement dependence analysis within an assignment statement.

5. The method of claim 1 wherein the step of identifying the first subset of the plurality of assignment statements which may not be fused into a single loop further comprises performing interstatement dependence analysis between an assignment statement and a subsequent assignment statement.

6. The method of claim 1 further comprising the step of:

identifying a non-fusion boundary between a pair of adjacent assignment statements of the plurality of assignment statements, where assignment statements preceding the non-fusion boundary and assignment statements subsequent to the non-fusion boundary may not be fused into a single loop.

7. The method of claim 6 wherein the step of identifying the non-fusion boundary between the pair of adjacent assignment statements further comprises the steps of:

identifying an assignment statement subsequent to the non-fusion boundary as a beginning of a potential fusion loop; and identifying an assignment statement preceding the non-fusion boundary as an end of a potential fusion loop.

8. The method of claim 7 wherein the step of fusing assignment statements further comprises the step of:

fusing a plurality of assignment statements located between a beginning of a potential fusion loop and an end of a potential fusion loop.

9. An article of manufacture for use in a computer system for translating a WHERE construct, containing a plurality of assignment statements, in a source program, said article of manufacture comprising a computer-readable storage medium having a computer program embodied in said medium which may cause the computer system to:

identify a first subset of the plurality of assignment statements, the first subset comprising a pair of assignment statements which may not be fused into a single loop, by causing the computer to store an indication of the pair of assignment statements in a three dimensional data structure, wherein:

a first dimension corresponds to a first assignment statement of the pair of assignment statements;

a second dimension corresponds to a second assignment statement of the pair of assignment statements;

a third dimension corresponds to a loop level at which the pair of assignment statements may not be fused into a single loop; and the indication is indexed by the first assignment statement, the second assignment statement, and the loop level;

responsive to the identifying of the first subset, identify a second subset of the plurality of assignment statements which may be fused into a single loop; and responsive to the identifying of the second subset, fuse the second subset of the plurality of assignment statements into a single loop.

10. The article of manufacture of claim 9 wherein the computer program in causing the computer system to identify the first subset of the plurality of assignment statements which may not be fused into a single loop may further cause the computer system to identify a transformational intrinsic function.

11. The article of manufacture of claim 10 wherein the computer program in causing the computer system to fuse assignment statements may further cause the computer system to:

exclude an assignment statement containing an intrinsic transformational function from the fusing.

12. The article of manufacture of claim 9 wherein the computer program in causing the computer system to identify the first subset of the plurality of assignment statements which may not be fused into a single loop may further cause the computer system to perform intrastatement dependence analysis within an assignment statement.

13. The article of manufacture of claim 9 wherein the computer program in causing the computer system to identify the first subset of the plurality of assignment statements which may not be fused into a single loop may further cause the computer system to perform interstatement dependence analysis between an assignment statement and a subsequent assignment statement.

14. The article of manufacture of claim 9 wherein the computer program may further cause the computer system to:

identify a non-fusion boundary between a pair of adjacent assignment statements of the plurality of assignment statements, where assignment statements preceding the non-fusion boundary and assignment statements subsequent to the non-fusion boundary may not be fused into a single loop.

15. The article of manufacture of claim 14 wherein the computer program in causing the computer system to identify the non-fusion boundary between the pair of adjacent assignment statements may further cause the computer system to:

identify an assignment statement subsequent to the non-fusion boundary as a beginning of a potential fusion loop; and identify an assignment statement preceding the non-fusion boundary as an end of a potential fusion loop.

16. The article of manufacture of claim 15 wherein the computer program in causing the computer system to fuse assignment statements may further cause the computer system to:

fuse a plurality of assignment statements located between a beginning of a potential fusion loop and an end of a potential fusion loop.

17. A computer system for translating a WHERE construct, containing a plurality of assignment statements, in a source program, said computer system comprising:

means for identification of a first subset of the plurality of assignment statements, the first subset comprising a pair of assignment statements which may not be fused into a single loop, by storage of an indication of the pair of assignment statements in a three dimensional data structure, wherein:

a first dimension corresponds to a first assignment statement of the pair of assignment statements;

a second dimension corresponds to a second assignment statement of the pair of assignment statements;

a third dimension corresponds to a loop level at which the pair of assignment statements may not be fused into a single loop; and         the indication is indexed by the first assignment statement, the second assignment statement, and the loop level;

responsive to the identification of the first subset, means for identification of a second subset of the plurality of assignment statements which may be fused into a single loop; and     responsive to the identification of the second subset, means for fusion of the second subset of the plurality of assignment statements into a single loop.

18. The computer system of claim 17 wherein the identification of the first subset of the plurality of assignment statements which may not be fused into a single loop further comprises means for identification of a transformational intrinsic function.

19. The computer system of claim 18 wherein the fusion of assignment statements further comprises:

exclusion of an assignment statement containing an intrinsic transformational function from the fusion.

20. The computer system of claim 17 wherein the identification of the first subset of the plurality of assignment statements which may not be fused into a single loop further comprises means for intrastatement dependence analysis within an assignment statement.

21. The computer system of claim 17 wherein the identification of the first subset of the plurality of assignment statements which may not be fused into a single loop further comprises means for interstatement dependence analysis between an assignment statement and a subsequent assignment statement.

22. The computer system of claim 17 further comprising:

means for identification of a non-fusion boundary between a pair of adjacent assignment statements of the plurality of assignment statements, where assignment statements preceding the non-fusion boundary and assignment statements subsequent to the non-fusion boundary may not be fused into a single loop.

23. The computer system of claim 22 wherein the identification of the non-fusion boundary between the pair of adjacent assignment statements further comprises:

identification of an assignment statement subsequent to the non-fusion boundary as a beginning of a potential fusion loop; and     identification of an assignment statement preceding the non-fusion boundary as an end of a potential fusion loop.

24. The computer system of claim 23 wherein the fusion of assignment statements further comprises:

fusion of a plurality of assignment statements located between a beginning of a potential fusion loop and an end of a potential fusion loop.

\* \* \* \* \*